Patented Oct. 27, 1931

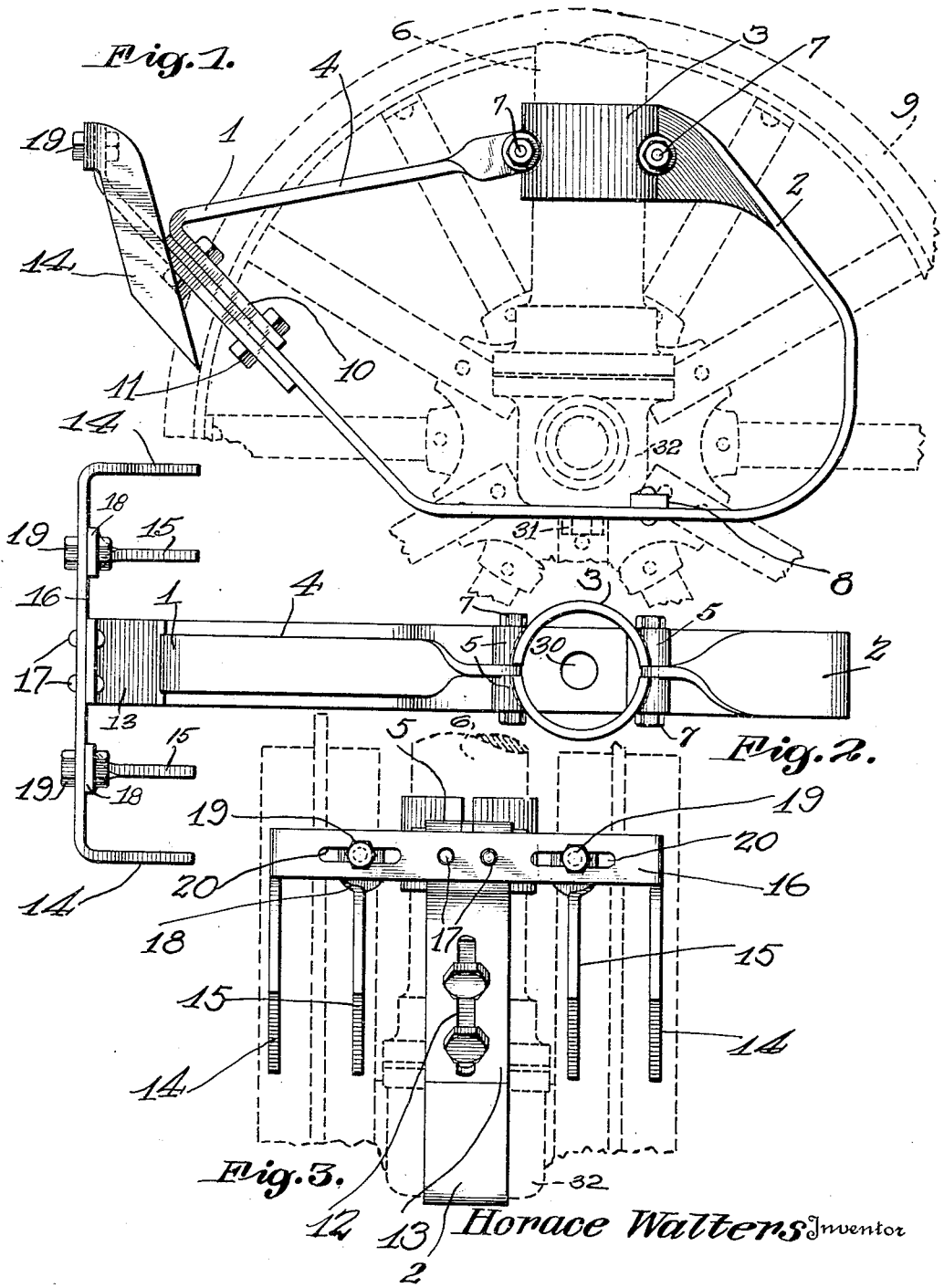

1,829,172

UNITED STATES PATENT OFFICE

HORACE WALTERS, OF CENTER TOWNSHIP, CALHOUN COUNTY, IOWA

WHEEL SCRAPING ATTACHMENT FOR TRACTORS

Application filed June 11, 1928. Serial No. 284,609.

This invention relates to a wheel scraping attachment for tractors and has for its primary object the construction of a device of this character that may be effectually secured to a component part of the tractor in a predetermined position relative to the tractor wheels so that a plurality of scrapers may be continuously held in proper cooperative relation with the peripheral surface of the tractor wheels to scrape accumulations therefrom in the use of the tractor.

Another object of the invention is the construction of an attachment of a simplified design that may be quickly bolted or attached to the upright bolster of the tractor in a manner to properly position a group of scrapers in operative relation with the peripheral surface of the tractor wheels.

Another object of the invention is the co-relation of parts whereby upon the attachment of the device to the upright bolster of the tractor an operative connection is established between the device and the tractor wheels so as to assure proper positioning of the attachment at all times irrespective of the change in position of the tractor wheels in the guiding of the tractor over the ground.

Besides the above my invention is distinguished in the novel construction and core-lation of the group of scrapers whereby the entire peripheral surface of the tractor wheel may be properly acted upon.

Besides the above my invention is distinguished in the adjustability of the scrapers relative to each other and to the surface of the tractor wheels so as to assure positive operation.

With these and other objects in view the invention will be better understood from the following detailed description taken in connection with the accompanaying drawings wherein:

Figure 1 is a side elevation of the attachment in applied position.

Figure 2 is a top plan view.

Figure 3 is a front elevation.

Again referring to the drawings illustrating one of the many constructions of my invention, the numeral 1 designates the frame in its entirety consisting of the brace 2, the attaching arm or collar 3 and the connector 4. In Figure 1 of the drawings, I have illustrated in dotted lines, a steering wheel of a tractor which is rotatably mounted upon an axle, the axle having a central bearing portion indicated by the numeral 32. The framework of the tractor comprises an upright bolster 6 through which extends a steering shaft (not shown), this latter being connected to the central portion 32 of the axle. In this type of tractor, a pair of steering wheels, one of which is indicated by the numeral 9, are mounted upon the opposite end of the axle 32, whereby the wheels will turn in unison when steering the tractor over the ground. The collar 3 is preferably made in two sections as shown, each section having formed therewith bearing sleeves 5 through which extends suitable fastening bolts 7, whereby the collar may be fitted loosely around the upright bolster 6 in the manner as is indicated in Figure 1 of the drawings. The brace 2 has one end fitted between the bearing sleeves 5 at one side of the collar and is secured thereto by means of one of the bolts 7. The medial portion of the brace 2 has formed therein an opening indicated by the numeral 30 upon Figure 2 of the drawings, through which extends a bolt 31 for securing the brace to the central portion of the axle 32, in the manner as is shown in Figure 1 of the drawings. Secured upon the brace 2 is a block indicated by the numeral 8, which engages the axle 32 for preventing the brace 2 from turning upon its connection to the axle by means of the bolt 31, causing the brace 2 to turn with the axle during steering of the wheels 9. Also pivotally connected to the collar 3 is one end of the connector 4, which end of this connector extends between the bearing sleeves 5 at the opposite side of the collar 3 to which the brace 2 is connected and is secured thereto by means of one of the bolts indicated by the numeral 7. From this construction, it is obvious that the collar 3 merely provides a guide for the brace 2 and connector 4, and the entire frame 1 of the device being attached to and supported by the axle 32 of the tractor by means of the bolt 31, whereby the collar 3, brace 2 and connector 4 will readily turn with the axle so that in the steering movements of the tractor wheels 9, the scrapers to be hereinafter more fully described, will assume the proper position at all times relative to the tractor wheels.

The connector 4 is provided with a flange 10 directly bolted to the free end of the brace 2 as indicated at 11, and these bolts 11 are adjustably related with the walls of the slot 12 in the adjustable bar 13, with the result that this bar 13 may be adjusted relative to the frame for properly positioning a group of scrapers relative to the peripheral surface of the wheel associated therewith.

These scrapers hereinafter designated as the main scrapers 14 and the auxiliary scrapers 15 have adjustable relation with each other and with the peripheral surface of the tractor wheels so as to assure positive action. To accomplish this desired result I provide a cross bar 16 rigidly secured to the bar 13, as indicated at 17, and having its ends properly shaped to provide the heretofore mentioned main scrapers 14. The auxiliary scrapers 15 are provided with heads 18 carrying bolts 19 that are adjustably mounted in the slots 20 formed in the cross bar 16. Thus, it will be appreciated that the auxiliary scrapers can be adjusted towards and away from the main scrapers and all of the scrapers simultaneously adjusted towards the peripheral surfaces of the tractor wheels by means of the bolts 11.

From the foregoing description, taken in connection with the accompanying drawings it will be appreciated that I have designed a simplified type of attachment that may be quickly and effectively secured to a portion of a tractor for properly positioning a group of scrapers relative to the peripheral surface of the tractor wheels so that in the use of the tractor, accumulations upon the tractor wheels may be effectively removed. It will of course be understood that various other types of scrapers may be used in conjunction with my novel type of supporting frame and various other types of supporting frames may be used with my particular type of scrapers and therefore, I do not desire to be limited in protection in any manner whatsoever except as set forth in the following claims.

What I claim is:

1. A wheel scraping attachment for tractors comprising a collar, a brace, a connector, means for pivotally connecting one end of said brace and connector to said collar, means for adjustably connecting the opposite ends of said brace and connector together, a bar adjustably connected to said brace and connector, main scrapers formed with the outer end of said bar, auxiliary scrapers, and means for adjustably connecting said auxiliary scrapers to said bar between said main scrapers whereby said auxiliary scrapers may be independently adjusted relative to said main scrapers.

2. The combination with a tractor having an upright bolster and steering axle rotatably connected to said bolster, of a sleeve loosely mounted upon said bolster, a brace connected to said sleeve, scrapers carried by the outer end of said brace, and means for operatively connecting said brace to the steering axle of the tractor whereby said brace and scrapers carried thereby will at all times assume the proper position upon the tractor wheels whereby the latter may be scraped.

3. The combination with a tractor having an upright bolster, a steering axle rotatably connected to said bolster and carrying steering wheels, of a sectional collar loosely mounted upon said bolster, a brace having one end connected to said collar, means for securing said brace to the axle of the tractor, scrapers carried by the outer end of said brace, and a connector for connecting the outer end of said brace to said collar substantially as and for the purpose specified.

4. The combination with a tractor having an upright bolster, a steering axle rotatably connected to said bolster and carrying steering wheels, a sectional collar slidably mounted upon said upright bolster, a brace bar, means for pivotally connecting one end of said brace bar to said collar, means for fixedly connecting the medial portion of said brace bar to the steering axle of the tractor, a block carried by said brace bar and engaging the steering axle of the tractor to prevent movement of the brace bar with respect to the steering axle, an adjustable bar, a cross bar connected to said adjustable bar, scrapers formed with the outer ends of said cross bar, adjustable scrapers connected to said cross bar and arranged between said scrapers formed with the outer end of said cross bar and said adjustable bar, a connector bar, means for pivotally connecting one end of the connector bar to said collar and bolts, for adjustably connecting the opposite end of said connector bar and the adjustable bar to the outer end of said brace bar.

5. In combination, a tractor frame, having a downwardly extending sleeve, an axle pivotally mounted adjacent to the lower end of said sleeve, a wheel on each end of said axle, a scraper arm secured to said axle projecting horizontally and rearwardly between said wheels, a brace connected to the rear end of said arm and extending upwardly and forwardly and having its upper end rotatively mounted on said sleeve, and scraper devices carried by the free end of said arm to engage the periphery of said wheels.

In testimony whereof I have affixed my signature.

HORACE WALTERS.